E. G. & A. E. QUICKEL.
FOLDING JACK TRUCK MECHANISM.
APPLICATION FILED OCT. 31, 1912.
1,064,538.
Patented June 10, 1913.
2 SHEETS—SHEET 1.
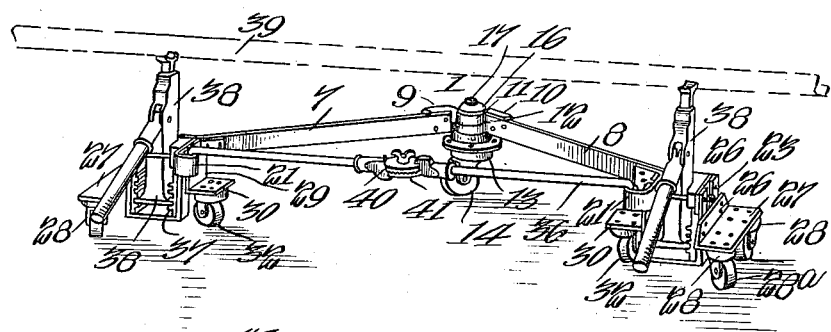
INVENTORS
EDWIN G. QUICKEL,
ALLEN E. QUICKEL,
BY Munn & Co
ATTORNEYS
WITNESSES
E. M. Callaghan
Walton Harrison E. G. & A. E. QUICKEL.
FOLDING JACK TRUCK MECHANISM.
APPLICATION FILED OCT. 31, 1912.
1,064,538.
Patented June 10, 1913.
2 SHEETS—SHEET 2.
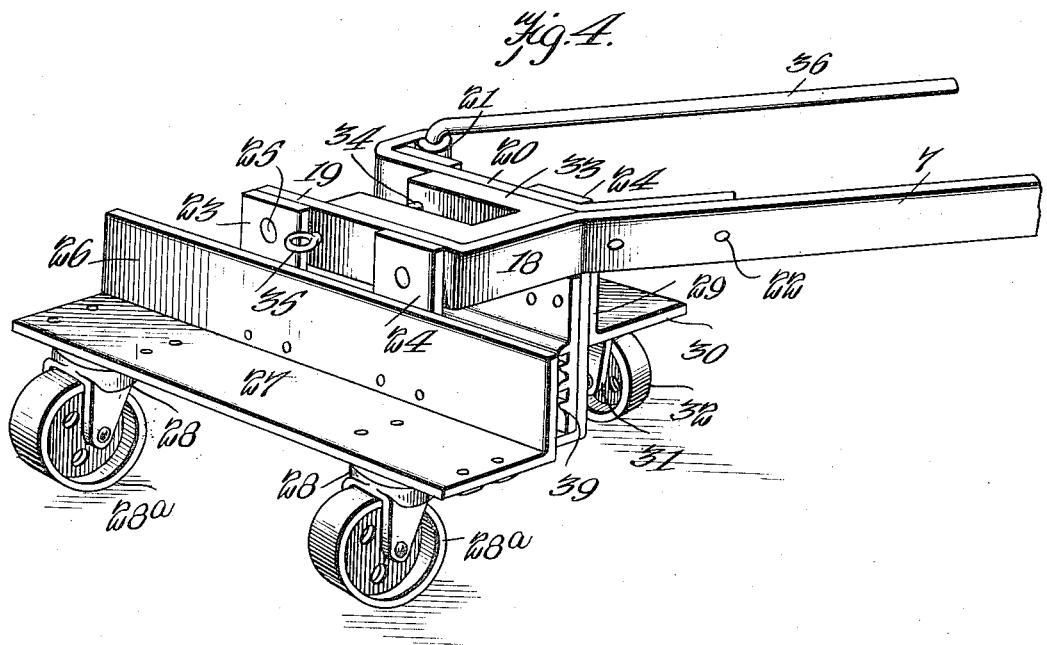
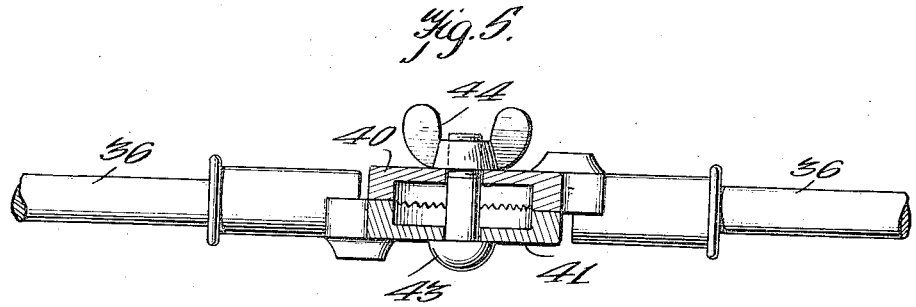
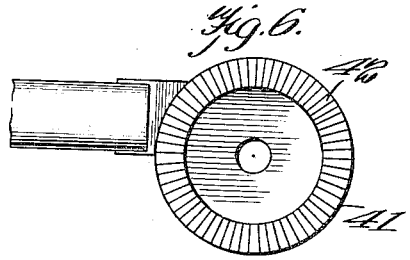
WITNESSES
E. M. Callaghan
Walton Harrison
INVENTORS
Edwin G. Quickel,
Allen E. Quickel,
BY Munn & Co.
ATTORNEYS

UNITED STATES PATENT OFFICE.

EDWIN G. QUICKEL AND ALLEN E. QUICKEL, OF YORK, PENNSYLVANIA.

FOLDING JACK TRUCK MECHANISM.

1,064,538.

Specification of Letters Patent. Patented June 10, 1913.

Application filed October 31, 1912. Serial No. 728,841.

*To all whom it may concern:*

Be it known that we, EDWIN G. QUICKEL and ALLEN E. QUICKEL, citizens of the United States, and residents of York, in the county of York and State of Pennsylvania, have made certain new and useful Improvements in Folding Jack Truck Mechanisms, of which the following is a specification.

Our invention relates to folding jack truck mechanisms of the type suitable for lifting and supporting automobiles and other heavy vehicles of the kind ordinarily equipped with pneumatic tires.

More particularly stated our invention comprehends a simple and efficient jack mechanism easily folded in order to stow it away in a small space, and provided with shoes in which jacks are placed for the purpose of engaging the axles of the vehicle in order to raise it slightly from the ground or floor, so as to prevent the weight of the vehicle from maintaining undue air pressure in the tires. The life time of the tire may be lengthened considerably if the pneumatic strain upon the tire may be relaxed at intervals. Our invention is to be employed, therefore, for supporting the weight of the vehicle in order that injury to the tires may be reduced to a minimum during the time while the tires are not actively in use, and especially while the vehicle is resting idly in a garage.

Our invention contemplates a number of improvements in the jack mechanism, whereby the latter is rendered to a great extent self-adjusting, and so arranged that the weight of the vehicle is equalized, as far as practicable, between various parts which are to support it.

Our invention further contemplates a folding jack truck mechanism which may be adjusted to any desired width, so as to accommodate itself to axles of various kinds and to be brought into engagement with an axle at any desired distance apart, ranging say from 12 to 36 inches, and otherwise adapted to fit all types of front and rear axles employed upon automobiles.

Our invention further contemplates the use of supporting shoes for carrying the jacks, each supporting shoe resting upon a so-called triple support consisting, in this instance, of three casters.

Our invention moreover contemplates the use of a triple support for the jack mechanism employed at each end of the vehicle; that is to say, two shoes, each supported as above indicated, and a third support, which in this instance is a caster of larger size than the other casters employed.

Reference is made to the accompanying drawings forming a part of this specification, and in which like letters indicate like parts.

Figure 1 is a perspective showing our improved jack mechanism complete and ready for use under one end of the vehicle, Fig. 2 is a plan view of the same, showing it as folded and ready to be stowed away, Fig. 3 is a cross section through one of the shoes, Fig. 4 is a fragmentary perspective, showing one of the shoes and parts immediately adjacent thereto, Fig. 5 is a fragmentary section, showing portions of the coupling rods and means for securing the same together at different angles, and Fig. 6 is a detail, showing in fragmentary plan a portion of the coupling for connecting together the coupling rods.

Two arms 7 and 8 are made of metal, and each has the form of a flat bar resting upon one of its edges. Mounted upon the arms 7 and 8 are plates 9 and 10, provided respectively with annular bearings or eyes 11 and 12. Below these eyes is a caster 13 of large size provided with a trailing wheel 14 for engaging the floor or the ground, as the case may be. The caster is provided with a stem 15, extending upwardly through the eyes 10 and 11. Mounted upon the stem 15 is a plate 16, secured thereto by aid of a nut 17 and normally rigid relatively to the stem, so as to permit the arms 8 to move relatively to each other upon the stem 15 as a center. Each arm 7 and 8 is provided with a portion 18, bent slightly out of alinement with the body portion of the bar, and is further provided with a portion 19 bent to a right angle with the portion 18. Another bar 20 is provided with an eye 21 integral with it, and is secured to each bar 7 or 8 by aid of rivets 22, or other appropriate fastenings.

Two straps 23 and 24, each of substantially U-shape, are secured to each portion 19 and the oppositely disposed bar 20, as will be understood from Fig. 2, and held in position by aid of bolts 25. Mounted upon the U-shaped members 23 and 24 is an angle iron 26, provided with a flange 27 integral with it and extending laterally outward from the U-shaped member. Another angle iron 29, somewhat shorter than the angle iron 26, is secured to the U-shaped members 23 and 24, but on the side thereof opposite the angle iron 26, and is provided with a laterally extending flange 30. Depending from this flange 30 is a caster 31 provided with a trailing wheel 32. The flange 27 is provided with two casters 28, each having its trailing wheel 28ª. The casters 28 and 31 are self-adjusting in the sense that their trailing wheels may be turned in any number of planes crossing the general plane of rotation of the wheels. Located between the bar 20 and the adjacent portion 19 of the arm 7 is a substantially U-shaped block 33. Extending through this block, and through the bar 20 and adjacent portion 19 of the arm 7, is a pin 34, provided with an eye 35, by aid whereof it may be withdrawn or inserted as desired.

The parts just described, and appearing more particularly in Fig. 4, together constitute a shoe for supporting one of the jacks, the shoe resting upon a triple support, consisting essentially of three self-adjusting casters. Mounted within the shoe are two racks 36, provided with ribs 37 integral with them and disposed in pairs, as indicated in Fig. 3.

Jacks are shown at 38 and are each provided with a base 39, this base being of proper width to fit between a pair of the lugs 37, so that the jacks may be slidably introduced within the shoe, as will be understood from Fig. 3. Moreover, as there are several pairs of lugs 37, the jack may be located at any one of a number of different levels at the will of the operator. Again in some instances, the jacks employed may be lower or shorter than in others, and in such cases, the jack can be slipped into either one of the slide-ways constituted by the pair of lugs 37, the jack being thus free to adjust itself better to the height of the axle.

The coupling rods 36 are provided with heads 40 and 41, each having the form indicated in Figs. 5 and 6. Each head is provided with radially disposed teeth 42 adapted to interlock, as indicated in Fig. 5. A bolt 43 extends centrally through the two heads 40 and 41, and is engaged by a thumb nut 44, which may be turned, so as to force the two heads tightly together, and thus lock them rigidly in any one of a number of predetermined relative positions. That is to say the thumb nut 44 is loosened, the coupling rods are adjusted to a suitable angle or disposed in alinement with each other, as desired, and the thumb nut is then tightened so as to leave the coupling rods rigid.

The operation of our device is as follows:—When the mechanism is not in use it is folded as indicated in Fig. 2. For this purpose the thumb nut 44 is loosened, the shoes are forced toward each other, and now occupy the positions indicated and the mechanism, as a whole, has a fair degree of rigidity. In order to use the mechanism for lifting and supporting a vehicle, such as an automobile, the thumb nut 44 is loosened, jacks are placed in the shoes, as indicated in Fig. 3, the shoes are moved apart to any desired extent, ranging say from 12 to 36 inches so that the mechanism will fit any kind of front or rear axle used upon an automobile, and the upper ends of the jacks are placed against the under side of the vehicle axle. The jacks are now actuated so as to lift the vehicle, so that the tires thereof clear the floor or other supporting surface. The thumb nut 44 being now tightened, the parts connecting the shoes are rendered rigid. Both axles of the vehicle being supported in the manner indicated (an apparatus of the kind shown in Fig. 2 being employed in connection with each axle) the vehicle no longer rests with its weight upon the tires. Moreover, by pushing sidewise upon the vehicle, the various casters adapt themselves accordingly, and the vehicle may be moved sidewise, or at practically any desired angle relatively to its longitudinal position, and may thus be moved over into a corner of the garage, or otherwise placed as desired. In order to use the vehicle, the jacks are operated, so as to lower the machine until it rests upon its tires, after which the jack mechanism is removed, as above indicated, and may be placed either in the vehicle or stowed away in the garage.

It will be noted that when the device shown in Fig. 1 is in action the weight of the adjacent portion of the vehicle is supported mainly upon two shoes, each having a triple support, and that the jack mechanism, as a whole, rests upon a triple support consisting of the two shoes and the large caster with which the bars 7 and 8 are connected.

We do not limit ourselves to the precise construction shown, as variations may be made therein without departing from the spirit of our invention. While we show the casters as of ordinary construction, they may be equipped with ball bearings if desired, the substitution of antifriction bearings for ordinary bearings being old and well known in this art.

Having thus described our invention, what we claim as new and desire to secure by Letters Patent is as follows:—

1. A folding jack truck mechanism comprising a plurality of supporting shoes, an arm rigidly connected with each shoe, said arms being pivotally connected together, and coupling rods extending from one shoe to another.

2. A folding jack truck mechanism comprising a pair of supporting shoes, arms connected with said shoes and pivotally connected together, coupling rods connected with said shoes and provided with heads, said coupling heads being movable at different angles relatively to each other, and means controllable at the will of the operator for securing said heads rigidly together in order to render said coupling rods rigid.

3. A folding jack truck mechanism comprising a pair of shoes, arms rigidly connected therewith and pivotally connected together, a caster connected with said arms at the point of pivotal connection thereof, coupling rods pivotally connected with said shoes and provided with heads, said heads being movable relatively to each other for enabling the coupling rods to be adjusted relatively to each other, and means controllable at the will of the operator for securing said heads rigidly together.

4. A folding jack truck mechanism comprising a plurality of supporting shoes, arms connected rigidly with said supporting shoes and pivotally connected together, coupling rods pivotally connected with said supporting shoes and adjustable relative to each other, and means controllable at the will of the operator for securing said arms together when thus adjusted.

5. A folding jack truck mechanism comprising a plurality of supporting shoes, an arm rigidly connected with each shoe, the arms being pivotally connected together, and bracing mechanism extending from one shoe to another.

EDWIN G. QUICKEL.
ALLEN E. QUICKEL.

Witnesses:
WILLIAM H. KUHL,
MARGARET M. QUICKEL.